United States Patent [19]

Slusky

[11] Patent Number: 5,440,620
[45] Date of Patent: Aug. 8, 1995

[54] TELECOMMUNICATIONS SYSTEM SUBSCRIBER PROFILE UPDATING

[75] Inventor: Ronald D. Slusky, Highland Park, N.J.

[73] Assignee: AT&T Corp., Murray Hill, N.J.

[21] Appl. No.: 937,805

[22] Filed: Aug. 28, 1992

[51] Int. Cl.⁶ ............... H04M 11/00; H04M 3/42
[52] U.S. Cl. ................... 379/100; 379/201; 379/211; 379/212
[58] Field of Search ........... 379/93, 94, 96, 97, 379/98, 100, 112, 211, 201, 207, 212; 358/400, 402, 403, 434, 438, 439, 468

[56] References Cited

U.S. PATENT DOCUMENTS

| | | | |
|---|---|---|---|
| 4,893,333 | 1/1990 | Baran et al. | 358/468 |
| 4,941,170 | 7/1990 | Herbst | 358/440 |
| 4,996,707 | 2/1991 | O'Malley et al. | 379/94 |
| 5,072,309 | 12/1991 | Brown | 358/434 |
| 5,099,340 | 3/1992 | Kamada et al. | 358/403 |
| 5,153,744 | 10/1992 | Nobuta | 358/403 |
| 5,161,037 | 11/1992 | Saito | 358/468 |
| 5,267,303 | 11/1993 | Johnson et al. | 358/468 |

OTHER PUBLICATIONS

Advertisement for "PaperWorks" in The Wall Street Journal, Apr. 29, 1992, p. B16.

Promotional material on "PaperWorks" from Xerox Corporation, undated.

The Article "SNA Network Fax Gateway Conversions and Routing" by IBM Corp. pp. 479–480, 1991.

*Primary Examiner*—Curtis Kuntz
*Assistant Examiner*—Jason Chan
*Attorney, Agent, or Firm*—Eugene J. Rosenthal; Ronald D. Slusky

[57] ABSTRACT

Personal telephone number service is provided by an adjunct within a communications network to provide a number of functionalities, one of which allows associated subscribers to customize the way in which they receive telephone calls. In particular, each subscriber may dynamically specify a number of caller identifiers and a different call treatment for each such identifier as well as a particular billing mode. A call treatment may include, for example, a specification to forward an associated call to an (a) particular telephone number, (b) default telephone number, or (c) messaging service. A profile defining information about how services are to be carried out for a particular subscriber is created and/or updated via an arrangement which receives the information in facsimile form and then uses character recognition technology to "read" the information contained thereon and to update the profile.

23 Claims, 8 Drawing Sheets

FIG. 2

| PHONE.NUM | SUB.LANG | SUB.PIN | HOME.PHONE |
|---|---|---|---|
| PA.CALL | NUM.CIN | NUM.SCIN | NUM.MSG |
| CFNUM.1 | CFNUM.2 | CFNUM.3 | LINK.REC |
| CIN.1 | CIN.2 | CIN.3 | CIN.4 |
| SCIN.1 | SCIN.2 | SCIN.3 | SCIN.4 |

| S.PIN | SS.PIN |
|---|---|

FIG. 4

| CF.NUM | CF.DUR | CF.TIME |
|---|---|---|

FIG. 5

| CIN.NUM | CIN.NAME | CT.1 | CT.2 | CT.3 | CT.4 |
|---|---|---|---|---|---|

FIG. 6

| SCIN.NUM | SCIN.NAME | CT.1 | CT.2 | CT.3 | CT.4 |
|---|---|---|---|---|---|

FIG. 7

| CALL TREATMENT | CALL TREATMENT CODE |
|---|---|
| CALL FORWARD NO. 1 | *1 |
| CALL FORWARD NO. 2 | *2 |
| CALL FORWARD NO. 3 | *3 |
| HOME PHONE NO. | *4 |
| MESSAGING SVC. | *6 |
| NOT AVAILABLE | *8 |

FIG. 8

SUBSCRIBER PROFILE
700-555-2234

CALL FORWARDING NUMBERS

| CODE | NUMBER | DURATION | START DATE | START TIME |
|---|---|---|---|---|
| CF1 | (908) 555-9963 | PERMANENT | — | — |
| CF2 | (201) 555-1927 | 24 HOURS | 5/18/92 | 9 AM ☐ AM |
| CF3 | (609) 555-9191 | 8 HOURS | 5/20/92 | 6 ☒ PM |

CALL TREATMENTS

| CHARGE TO | ID | NAME | LANG. | CALL TREATMENT CODES | | | |
|---|---|---|---|---|---|---|---|
| CALLER | 949 | PATSY | ENG. | CF1 | CF2 | CF3 | — |
| CALLER | 271 | ANY | ENG. | MSG | — | — | — |
| CALLER | — | — | — | — | — | — | — |
| CALLER | — | — | — | — | — | — | — |
| CALLER | (#) | — | — | UNAV | — | — | — |
| ~~YOU~~ | ~~9247~~ | ~~TOM~~ | ~~ENG.~~ | ~~HOME~~ | ~~MSG~~ | — | — |
| YOU | 7272 | FIFI | FR. | HOME | CF2 | MSG | — |
| YOU | 9999 | TOM | ENG | HOME | CF3 | MSG | — |
| YOU | — | — | — | — | — | — | — |

WILL YOU PAY FOR ALL CALLS (NOW "NO") ?  YES ☐  NO ☒

DURATION ___ HOURS   START DATE __/__/__   START TIME ____ ☐ AM ☐ PM

TELECOMMUNICATIONS SYSTEM SUBSCRIBER PROFILE UPDATING

BACKGROUND OF THE INVENTION

The present invention relates to the creation and updating of subscriber profiles maintained and used within telecommunications systems.

Among the ever increasing array of services provided by telecommunications systems are services which operate on the basis of a subscriber profile. A subscriber profile, more particularly, is a database record containing information about how the service is to be perforated for a particular subscriber. A typical example is the personal telephone number service disclosed in the co-pending commonly assigned United States patent application of C. W. Creswell et al, Ser. No. 07/905,265, filed on Jun. 26, 1992, entitled "A System for Providing Personalized Telephone Calling Features." As described in that patent application, a caller who has dialed the personal, e.g., "700 area code", telephone number of a subscriber to the service is connected to a computer-based service adjunct which, upon answering the call, prompts the caller for a so-called "caller identification number." Upon receiving the caller identification number from the caller, such as via telephone pushbutton input, the system consults a subscriber profile associated with the called personal telephone number to determine whether the caller identification number is valid and, if it is, how the call is to be treated. As examples of various call treatments, the profile may indicate that, upon receiving a particular caller identification number, the call is to be forwarded to the subscriber's home telephone number, to some other subscriber-defined call forwarding telephone number, to a voice messaging system, or to a specified succession of these.

SUMMARY OF THE INVENTION

The contents of the profile are under the control of the subscriber to a great extent. For example, caller identification numbers can be added or deleted; the treatment to be accorded to a call for which any particular caller identification number was supplied by the caller can be changed; etc. Presently, the preferred technology for enabling the subscriber to create and thereafter modify his/her profile is by way of a voice interactive system, which leads the subscriber through a series of audibly presented "menus" and prompts him/her to supply the needed information via telephone pushbotton inputs.

I have come to realize that in this specific arena—the subscriber administration of telecommunications services profiles—the supposedly modern approach of using a voice interactive system for the creation and/or modification of the profile is not necessarily the best. In particular, systems such as that described above an be quite sophisticated and "feature-rich" in terms of, for example, the number of caller identification numbers that can be associated with a particular personal telephone number, the number of different call treatment parameters that can be specified for each caller identification number, etc. The more sophisticated and feature-rich such a system is, the greater the complexity of the tree of audible "menus" needed to create and/or update the profile, and it is my observation that with a complex menu system, the subscriber may well become "disoriented." That is, the subscriber may well loss track of which data is being presented for review and/or modification; what the current contents of the profile are; etc. Moreover, the amount of time required to make entries, receive and audible confirmation of the entries, etc., can become considerable, sand may lead to subscriber dissatisfaction.

In accordance with the invention, these problems are overcome by providing a subscriber to a telecommunications service with the ability to transmit profile creation and/or update information to the system in graphic form. The telecommunications system, in turn, "reads", or identifies, the profile information transmitted to it using machine-based image recognition technology such as character recognition and/or mark-sense, and automatically enters the information into the subscriber's profile. In preferred embodiments, a subscriber is provided with a printed questionnaire or other form on which information defining changes to be made to the profile can be supplied in graphic form by the subscriber and the form is communicated to the system using facsimile transmission.

In accordance with a feature of the invention, a subscriber may request the system to transmit a "hard-copy" version of the aforementioned form to him or her, again via facsimile. Moreover, the hard-copy version of the form that is so transmitted may, advantageously, include the subscriber's existing profile information, thereby giving the subscriber the opportunity to see at a glance the current contents of the profile; to make deletions, such as by drawing a line through an entry; to make changes to entries; and to add complete new entries.

The use of such a "pencil-and-paper" approach to the administration of a telecommunications service profile, although seemingly a step backward in the art—a throwback to the "old way of doing things"—is, to the contrary, I have realized, an improved approach over that which is standard in the art in that, for example, it obviates the aforementioned sources of subscriber disorientation and dissatisfaction and therefore makes such services more convenient to use.

BRIEF DESCRIPTION OF THE DRAWINGS

In the drawing,

FIG. 2 shows a number of the fields of a record containing profile information for a subscriber to the service;

FIGS. 3-6 show expanded versions of respective fields of the record of FIG. 2;

FIG. 7 illustrates a coding scheme for specifying respective call treatments in the fields of FIGS. 5 and 6;

FIG. 8 is a form generated by the adjunct of FIG. 1 in accordance with the principles of the invention;

DETAILED DESCRIPTION

Figure 1:
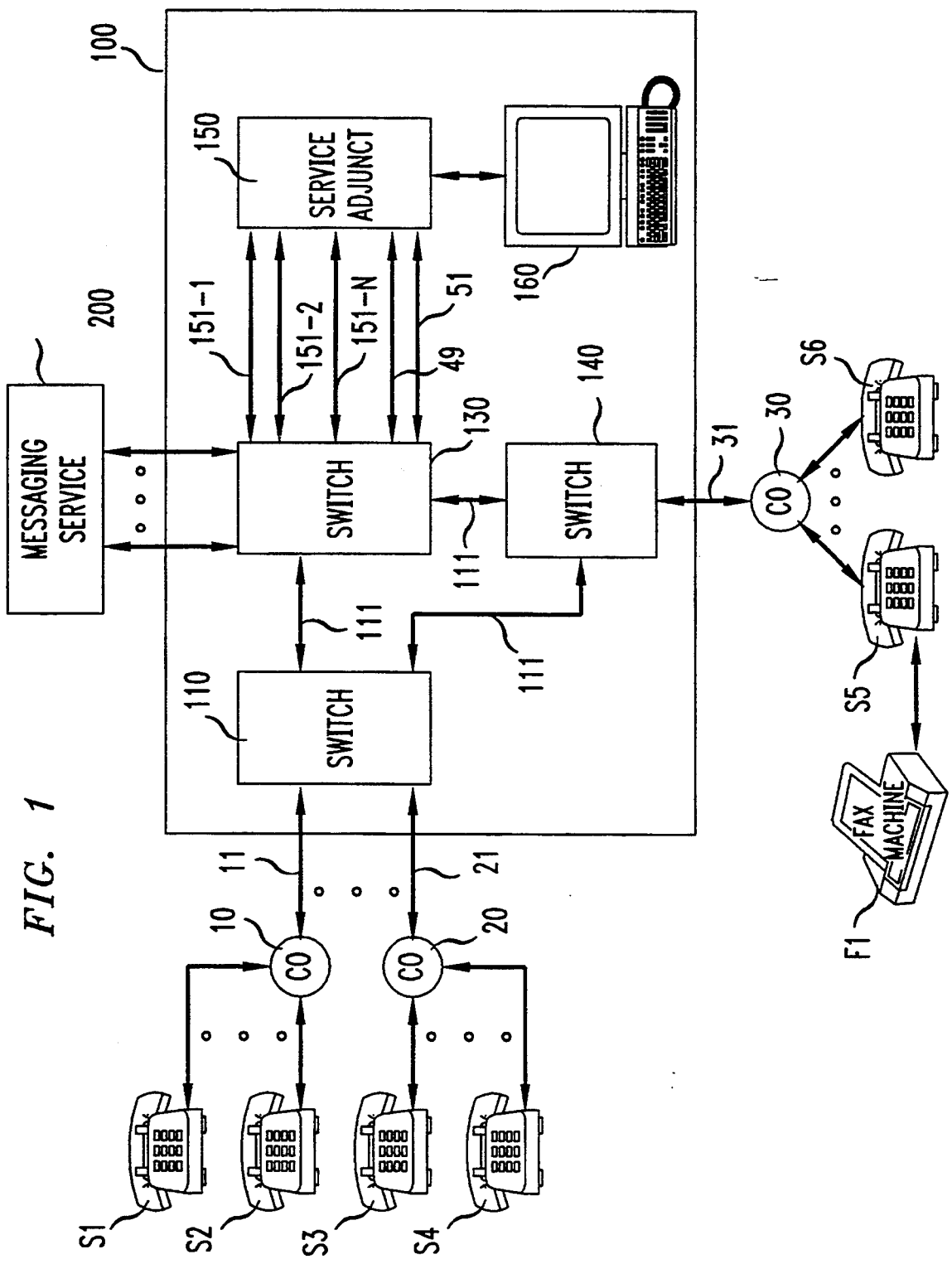
FIG. 1 is a block diagram of a communications network which includes a service adjunct implementing a personal telephone number service.

FIG. 1 shows a public switched telephone network 100 that provides long distance telephone services for its subscribers, such as the subscribers associated with telephone stations S1 through S6. Network 100 includes, inter alia, a plurality of switching offices, or switches, three of which—110, 130 and 140—are shown. The switches are interconnected via an intertoll network 111. A network switch may also be connected to one or more local Central Offices (CO), such as COs 10, 20 and 30, which serve stations S1 through S6.

Included in network 100 is service adjunct 150 which processes calls to a subscriber of a personal telephone number service in accordance with a telecommunications service profile associated with that subscriber. As described in detail hereinbelow, the information contained in the profile can be entered and/or changed by the subscriber via a) interaction with a voice interactive system, as in the prior art, or b) in accordance with the present invention, by using facsimile technology to transmit to the adjunct new or changed information in graphic form—the adjunct, in turn, using character recognition technology to "read" the profile information and to automatically update the subscriber's profile.

CREATION OF THE SUBSCRIBER PROFILE

A telephone user, illustratively calling from station S5, may subscribe to the personal telephone number service by dialing a predetermined telephone number, which causes network 100 to establish a connection to terminal 160 attended by a service representative. As a result of interacting with the representative, the new subscriber is assigned a unique personal telephone service number. In the illustrative embodiment, the personal telephone number is prefixed by the area code 700.

Associated with the personal telephone number is a Personal Identification Number (PIN), as many as four Caller Identification Numbers (CINs) and as many as four Secondary CINs (SCINs). As will be discussed below, a subscriber may define different call treatments for different ones of the subscriber's associated CINs and SCINs. Also, different billing modes are associated with CINs and SCINs. In particular, originators of calls associated with a SCIN pay for the call, whereas the subscriber pays for calls associated with CINs. A subscriber's PIN, CINs, and SCINs may be distinguished from one another by the number of digits forming those identifiers, for example, five, four and three digits, respectively.

As a further result of such interaction, the service representative positioned at terminal 160 causes a data record defining a profile for the new subscriber to be stored in memory internal to adjunct 150. An illustrative example of a such a record 300 is shown in FIG. 2, in which one or more of the fields define a particular aspect of the personal telephone number service as follows:

PHONE.NUM—defines the unique subscription telephone number, e.g., 700-555-2234, assigned to the associated subscriber.

SUB.LANG—identifies a particular language in which announcements are to be made to the subscriber.

SUB.PIN—defines the PIN assigned to the associated subscriber and may further define an associated secondary subscriber PIN.

HOME.PHONE—defines the subscriber's home telephone number.

PA.CALL—defines whether the subscriber will pay for all calls.

NUM.CIN—defines the number of CINs assigned to the associated subscriber.

NUM.SCIN—defines the number of SCINs assigned to the associated subscriber.

NUM.MSG—defines the number of voice messages stored in messaging service system 200 (FIG. 1) for the associated subscriber.

CFNUM.1-3—define respective call forwarding numbers when programmed by the subscriber.

LNK.REC—defines the address of an associated or secondary subscriber record.

CIN.1-4—define respective CINs and their respective call treatments as specified by the subscriber.

SCIN.1-4—define respective SCINs and their respective call treatments as specified by the subscriber.

Of the various fields forming a subscriber record, the SUB.PIN, CFNUM. 1-3, CIN. 1-4 and SCIN. 1-4 fields are formed from a number of subfields as shown in FIGS. 3 to 6, respectively. Referring to FIG. 3 first, the SUB.PIN field includes a S.PIN subfield for storing the subscriber's PIN and a SS.PIN subfield for storing the subscriber's secondary PIN, if any. The latter PIN is used in the case where two subscribers, e.g., a husband and wife, are sharing the same personal telephone number but, for example, wish to establish different subscriber profiles. If a secondary PIN is stored in the SS.PIN subfield, then the address of a subscriber record associated with that secondary PIN is stored in the LNK.REC field of the subscriber record.

Turning now to FIG. 4, each of the call forwarding fields, CFNUM.1-3, includes a CF.NUM subfield for storing a respective call forwarding telephone number and a CF.DUR subfield for specifying a period of time during which certain telephone calls will be forwarded to that telephone number. The start time for that period of time is specified in the associated CF.TIME subfield.

Turning now to FIG. 5, each of the CIN. 1-4 fields includes CIN.NUM and CIN.NAME subfields for respectively storing a caller identification number and an associated name that are defined by the subscriber. Each such field also includes up to four call treatments CT.1-4 that may be accorded to the associated CIN, as will be explained below. The SCIN.1-4 fields are similarly constructed, as shown in FIG. 6. It is through the specifying of data for these fields that the subscriber may specify particular call treatments that adjunct 150 will use in the processing of particular calls placed to the subscriber's service number, as will be discussed below.

Once the profile information has been stored in record 300, the subscriber may thereafter interact with adjunct 150 and update the record to (a) invoke particular calling features, (b) change the values of one or more of the assigned CINs and/or SCINs, (c) change various call treatments associated with one or more CINs and/or SCINs.

VOICE INTERACTIVE PROFILE UPDATING (PRIOR ART)

A subscriber may update the profile by dialing his/her service number, e.g., 700-555-2234, to establish a network 100 connection to adjunct 150. Switch 130, in a conventional manner, passes to adjunct 150 the calling and called telephone numbers. Responsive to the connection and receipt of those numbers, adjunct 150 translates the called personal telephone number into a memory location and unloads from its internal memory the data record 300 associated with that number. (Hereinafter the latter data record will also be referred to as the primary data record.) Adjunct 150 then prompts the calling party (subscriber in this instance) to enter a caller identification number or, in the event that the caller has not been given a caller identification number by the subscriber, the pound sign (#). As will be seen, the # sign functions as a default SCIN. In this example, the station S5 calling subscriber enters, via the associated station set keypad, his/her assigned PIN. Adjunct 150, responsive to receipt thereof, compares the value of the received PIN with the value of S.PIN contained in the associated primary data record. In this instance, adjunct 150 would find that the former and latter values match one another and therefore returns to the calling subscriber a prerecorded announcement listing a number of calling features that the subscriber may access and/or update.

(It is noted that if the attempted match fails, then adjunct 150 compares the value of the received PIN with the value (if any) stored in the SS.PIN subfield of the primary data record. If those values match one another, then adjunct 150 processes the call in accordance with the secondary subscriber data record ("secondary data record") whose memory location is identified by the contents of the primary record LNK.REC field. Since the functionality of the primary and secondary subscriber data records are virtually the same, the discussion herein referring to the former record pertains equally to the latter record. As such, the following discussion will be given in the context of the subscriber's primary data record.)

An illustrative example of the aforementioned calling features announcement, which is presented in the language defined in the SUB.LANG field, is as follows:

---

"Welcome to your personal telephone number service system.
To hear your voice messages -- press one,
to program or review call forwarding numbers -- press two,
to call home or place a call -- press three,      (1)
to access your caller identification numbers -- press four,
to transmit or receive a subscriber profile form -- press five,
to terminate this call, press star pound [i.e., *#]".

---

This announcement is the highest level audible "menu" of the menu "tree" presented to subscribers, and the entering of one of the digits "1" to "5" in response to this menu causes the system to present further menus and submenus further down in the tree, as will be seen as this description continues.

Assuming that the subscriber, responsive to announcement (1), enters the digit "1" by pressing the corresponding keypad button of station set S5, then adjunct 150, responsive thereto, unloads the contents of the NUM.MSG field of the associated record. If the contents of that field equals zero, then adjunct 150 transmits a message indicative of that fact to the calling subscriber.

If the value of the contents of the NUM.MSG field is greater than zero, then adjunct 150 returns a message reciting the contents of the latter field and presents a menu inviting access to the stored messages.

If the subscriber declines that invitation by entering, for example, the digit zero via the associated station set keypad, then adjunct 150, responsive thereto, retransmits announcement (1) to the calling subscriber. Alternatively, adjunct 150, responsive to receipt of another digit, e.g., the digit "1", establishes a connection to switch 130 and outpulses the telephone number assigned to messaging service 200. Switch 130, operating in a conventional manner, establishes a connection to service 200. Adjunct 150 then bridges the calling subscriber's connection to the connection extending to service 200. At that point, the subscriber may, in a conventional manner, interact with service 200 to hear voice messages that are addressed to the subscriber, as discussed above.

If, on the other hand, the calling subscriber desires to program call forwarding numbers and therefore in response to announcement (1) enters the digit "2", then adjunct 150 responds with a menu announcement detailing options that the subscriber may elect in connection with the call forwarding feature. An illustrative example of such a menu announcement is as follows:

---

"To review call forwarding numbers -- press one,
to program call forwarding numbers -- press two,      (2)
to return to main menu, press star pound [i.e., *#]"

---

If the subscriber, in response to announcement (2), enters the digit "1", then adjunct 150 transmits a verbal accounting of the contents of the CFNUM.1-3 fields, and presents the subscriber with a menu offering the opportunity to cancel any one or more of them.

If the subscriber enters the digit "2", adjunct 150 prompts him/her to enter a ten-digit call forwarding telephone number, its duration (one option being "permanent"), and the date and time that it is to become effective. Adjunct 150 confirms the entry of this information by returning an announcement indicative thereof and presents the subscriber with the option of changing or approving it. Once approved, the data are stored in CF.NUM, CF.DUR and CF.TIME subfields of ones of the fields CFNUM. 1-3 of the associated record.

Adjunct 150 then presents the subscriber with the option of programming another call forwarding number, and so forth.

After the subscriber has exited the call forwarding feature by entering "*#", adjunct 150 retransmits announcement (1). Assuming, now, that the calling subscriber enters the digit "3" in response to that announcement, adjunct 150 prompts the calling subscriber with a menu allowing him/her to indicate whether the calling subscriber desires to place a call to his/her home or some other location.

Assuming that the calling subscriber elects to call some other location, then adjunct 150, responsive thereto, requests entry of the ten-digit telephone number that the calling subscriber desires to call. Upon receipt of the last such digit, it then establishes a connection to switch 130 and outpulses the telephone number. If the subscriber had indicated a desire to call home, the telephone number stored in the HOME.PHONE field would have been outpulsed instead. In either case, as will be discussed below, adjunct 150 creates a billing record to track the time and charges for the associated call. Adjunct 150 then "bridges" the subscriber's inbound connection to the outbound connection between adjunct 150 and switch 130. In a conventional manner, switch 130 causes the aforementioned connection to be extended to the local CO, e.g., CO 20, serving the called telephone station set, e.g., S3, identified by the outpulsed telephone number. If CO 20 finds that station S3 is in a busy state (i.e., off-hook), then, CO 20 returns busy tone over the established connection. Assuming that is not the case, then CO 20 applies a ringing signal to the telephone line connected to called station S3. When the call is "answered", then the calling subscriber and answering party may begin to converse with one another over the bridged connections. At the termination of the call, adjunct 150 retransmits announcement (1) to the calling subscriber.

The subscriber is also provided with the capability of interacting with adjunct 150 for the purpose of administering the subscriber's CINs and SCINs. The subscriber invokes that capability by entering the digit "4" in response to hearing announcement (1). Adjunct 150, in response thereto, presents the user with a menu and submenus thereof detailing a number of different options relating to (a) adding, deleting, renaming and/or specifying the call treatments that are to be accorded to a respective caller identification number (CIN or SCIN) or (b) reviewing such numbers.

Specifically, if the subscriber elects to add a CIN or SCIN, then adjunct 150 requests entry of an identifier, for example, a four- or three-digit number, as the case may be. Upon receipt of the number, adjunct 150 transmits a verbal representation of the number to the subscriber as a way of confirming the subscriber's entry. Adjunct 150 then requests entry of the name that is to be associated with the received number. In an illustrative embodiment of the invention, a subscriber enters an alphabetic character by pressing respective keypad buttons on the associated station set in a well-known way. For example, to enter the name "Tom" the subscriber presses keypad buttons 8 and 1 for the "T" (first letter on button 8), buttons 6 and 3 for the "o" (third letter on button 6) and buttons 6 and 1 for the "m" (first letter on button 6). Responsive to the name entry, adjunct 150 transmits a verbal spelling thereof as a way of confirming the entry. Adjunct 150 then stores the entered CIN (SCIN) and associated name in an available one of the fields CIN.1-4 (SCIN.1-4).

If, in the above example, the subscriber fails to start the entry of a name within a predetermined period of time, e.g., five seconds, then adjunct 150 assigns a default name to the newly added CIN or SCIN. Such a default name is selected based on the number of caller identification numbers that are contained in the subscriber's associated record. That is, if the number of CINs and SCINs in the record is eight, then a default name of "nine" may be assigned to the next CIN or SCIN that is added to record. If adjunct 150 makes such a default assignment, then adjunct 150 advises the subscriber of that fact by transmitting the default name to the subscriber. At that point, the subscriber may change the default name by entering a desired name in the manner described above.

Adjunct 150 then requests entry of the call treatments for the newly added CIN or SCIN. FIG. 7 shows the various call treatments and associated codes that a subscriber may specify for a particular CIN or SCIN. For example, if the subscriber enters codes "*4" and "*6" in that order, then adjunct 150 stores those codes in subfields CT.1 and CT.2 of the associated CIN (or SCIN) field. Thereafter, in response to an incoming call associated with the newly added CIN, adjunct 150 forwards the call to the subscriber's home telephone number. If the call is not answered, then adjunct 150 redirects the call to messaging service 200. As another example, assume that the subscriber enters treatment codes "4", "*3" and "*8", which would then be stored in subfields CT.1, CT.2 and CT.3, respectively. Also assume that, as before, the call to the subscriber's home telephone number goes unanswered. In that event, adjunct 150 redirects the call to the call forwarding number specified in the CFNUM.3 field of the associated record. If the latter call is not answered, then adjunct 150 advises the calling party that the subscriber is not available, as specified by treatment *8. As a further example, assume that the subscriber enters treatment codes "*1" and "*6". Then adjunct 150 forwards the incoming call to the call forwarding number contained in the CFNUM.1 field of the associated record. If that call is not answered, then adjunct 150 redirects the call to messaging service 200.

In a similar manner, the subscriber is provided with the opportunity to define call treatments for the case where the caller enters the # sign instead of a CIN or SCIN, as described below. (Although not shown in FIG. 2, record 300 further includes a field in which this information is stored.)

If the subscriber elects to delete a CIN or SCIN and advises adjunct 150 thereof, then adjunct 150 requests entry of the caller identification number that is to be deleted and, for example, clears the associated CIN or SCIN field containing the entered number. If, on the other hand, the subscriber elects to rename a caller identification number (CIN or SCIN), then adjunct 150 requests entry of that number as well as its new name. The subscriber, in response to the request, enters the caller identification number.

At any point during the administration of the CINs and SCINs, the subscriber may request to review his/her "list" of CINs and SCINs by entering a predetermined keypad digit, e.g., the digit "5" (which is representative of the letter L (List)). Adjunct 150, responsive to receipt of that request, transmits a verbal representation of the contents of the CIN.NAME subfield and then the contents of the CIN.NUM subfield of field CIN.1 to the subscriber. Adjunct 150 then presents the subscriber with the option of either changing the call treatments specified for the announced caller identification number or "skipping" to the next such number. If the subscriber elects the former option, then the subscriber may enter a new series of called treatment codes for the announced CIN (or SCIN). Adjunct 150, in response thereto, stores the received codes in respective subfields CT.1-4 of the identified field. Adjunct 150 then goes on to identify the next CIN or SCIN field. Adjunct 150 proceeds in foregoing manner with respect to each of the subscriber's CINs and SCINs (e.g., fields CIN.2 through SCIN.N (not shown)) and then announces when it has reached the end of the list.

From time to time, the subscriber might find it desirable to pay for all calls placed to the subscriber's service number regardless of whether or not a caller enters a CIN, a SCIN or a # sign in response to an initial adjunct 150 prompt. More specifically, following the administration of the subscriber's CINs and SCINs discussed above, adjunct 150 presents to the subscriber the option of invoking a "pay-all-calls" mode, during which the subscriber pays for all calls placed to his/her service number. The subscriber may invoke that option in response to a prompt from adjunct 150. Adjunct 150, in response thereto, inserts a predetermined value in the PA.CALL field of the associated record. Thereafter, in response to receipt of calls directed to the subscriber's service number, adjunct 150 charges the call to the subscriber as a result of finding that the associated PA.-

CALL field contains the aforementioned predetermined value.

The subscriber may limit the invocation of the pay-all-calls mode to a specified duration of time. That is, after selecting that mode, the subscriber may then enter a duration at the request of adjunct 150, in which the duration is specified as particular units of time, e.g., units of one hour each unit. For example, in response to an adjunct 150 request, the subscriber may enter the digit "2" to limit the duration of the pay-all-calls mode to two hours. Adjunct 150, in response to receipt of the digit, stores the current date and time, the value of "2" and aforementioned predetermined value in the PA.-CALL field of the associated record. Adjunct 150 thereafter clears the contents of that field during the processing of a call placed to the subscriber's service number subsequent to the expiration of the two-hour duration.

GRAPHIC PROFILE FORM UPDATING (THE INVENTION)

The problems that the present invention solves may now begin to be appreciated. In order for the subscriber to interact with adjunct 150 for purposes of creating or updating his/her profile, the subscriber must "traverse" a multiple-level menu structure which must, for example, a) inform the subscriber of the options available at each level, b) prompt the subscriber to enter information, c) verbally present any entered information back to the subscriber to verify that it was entered/received correctly. The potential complexity of this process can be appreciated by considering the above-described administration of a single CIN. In the course of administering a CIN, the subscriber needs to already know or, in the alternative, request that the system provide such information as, which CINs and SCINs already exist?
which call treatments are assigned to which CINs?
which person (name) is associated with which existing CIN?
which call forwarding numbers have already been programmed in?
when are each of the particular call forwarding numbers set to expire?
which call treatment codes correspond to which call treatments (FIG. 7)?

Keeping track of all this information and keeping track of what data is being dealt with at any point in time can become very difficult. Indeed, the subscriber may often become "disoriented," asking him/herself such questions as: "What am I doing now? Am I inputting the call treatments for Tom or the ones for Fifi? Is my "number two" call forwarding number my Middletown office or my Springfield office? Does the ID that I assigned to Fred charge the calls to me or will it charge the calls to him?" Thus the subscriber may find him/herself needing to frequently leave one menu, even though the data inputting is not yet complete, go to another menu to get some information, and then return. Indeed, unless the subscriber is sufficiently organized and patient enough to write down all the data presented at any particular point in the process, he/she may find it necessary to access certain information repetitively.

These problems are obviated by the present invention. The subscriber, upon entering the digit "5" from announcement (1), is presented with the following announcement menu:

"To receive a subscriber profile form -- press one,
to send a subscriber profile form -- press two, (3)
to return to main menu, press star pound [i.e., *#]"

Figure 13:
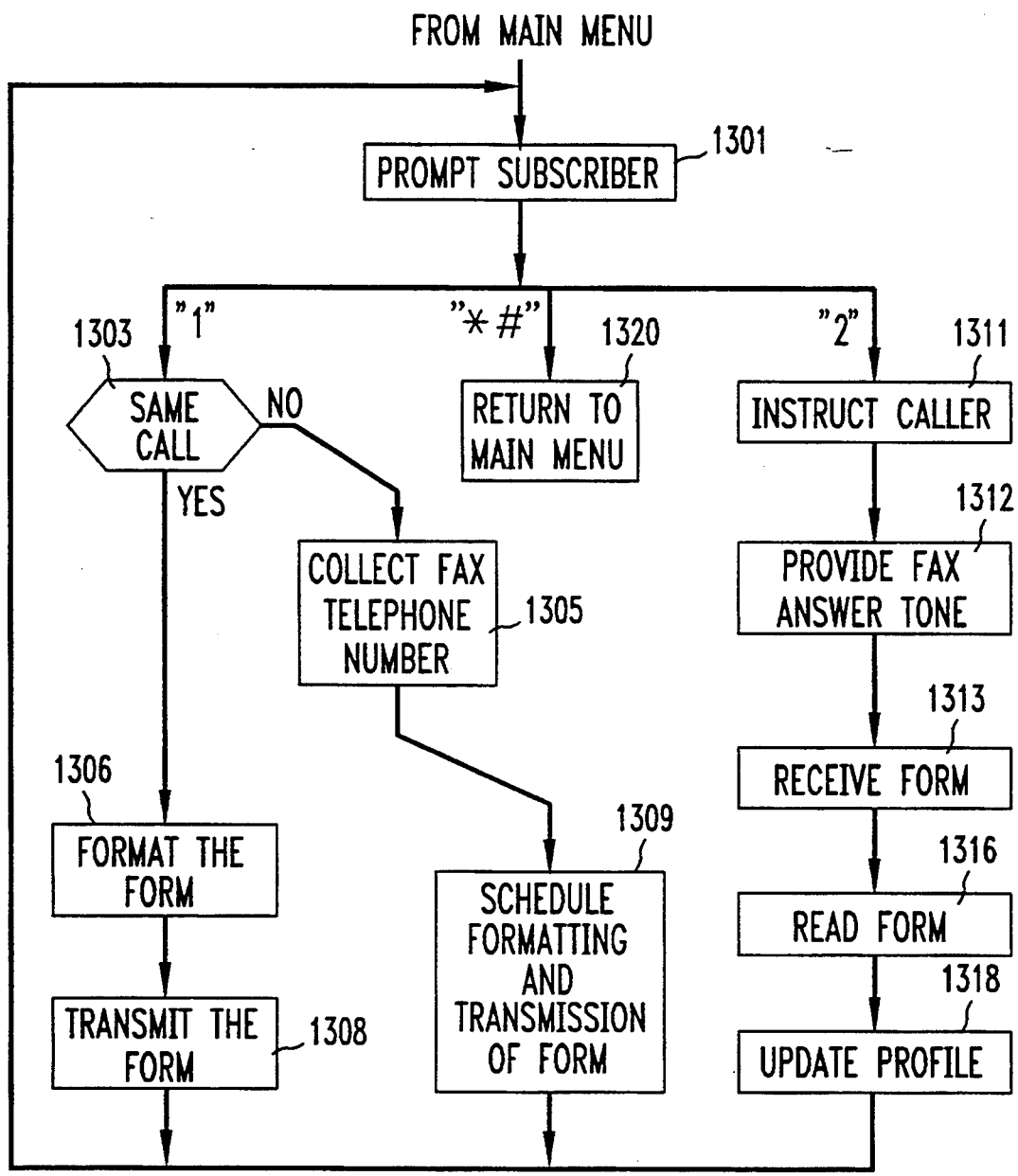
FIG. 13 is a flowchart of steps carried out by the service adjunct in implementing the invention.

The steps carried out by adjunct 150 in response to the subscriber entering "1", "2" or "*#" in response to the menu are shown in flowchart form in FIG. 13, beginning with the prompting of the subscriber with announcement (3) (block 1301 ).

Upon entering the digit "1", the subscriber is led through a series of steps which ultimately results in a facsimile transmission to the subscriber of a hard-copy version of the profile—specifically, a form such as the one shown in FIG. 8 (without the handwritten entries or deletion line shown in the Figure). Specifically, it is determined (block 1303) whether or not the form should be transmitted during this same telephone call, by prompting the subscriber to indicate whether the telephone call is being placed from a telephone set connected to a facsimile machine. This could be the case, for example, if the call were being made from telephone set S5 of FIG. 1, which is associated with facsimile machine F1. In this case, the hard-copy version of the form is formatted (block 1306) based on data in the subscriber's profile and then the subscriber is prompted to press the "start" button of the facsimile machine, after which the form is transmitted (block 1308). Announcement (3) is then re-presented (block 1301).

If the subscriber indicates that he/she is not calling from a telephone set connected with a facsimile machine, the subscriber will be prompted to enter the telephone number at which a facsimile machine can be reached, which telephone number is thereupon collected by adjunct 150 (block 1305). For example, a subscriber calling from station set S6 could give the telephone number associated with station set S5. In that case, adjunct 150 would schedule, at block 1309, the formatting of the form and the initiation of a separate telephone call to the number supplied, during which call the form then will be transmitted. Again, announcement (3) is then re-presented (block 1301).

At some later time after the form has been modified by the subscriber to include data that is to be incorporated into the profile, as is discussed below, the subscriber will again call his/her personal telephone number and will follow the above-outlined steps leading to the presentation of announcement menu (3). Now, however, the subscriber will enter the digit "2". At this time, the call must be made from a telephone associated with a facsimile machine, such as station set S5, because adjunct 150, responsive to the entry of that digit, will instruct the subscriber, at block 1311, to a) place the modified form in the facsimile machine, b) wait for the standard facsimile "answer" tone, and then c) press the facsimile machine "start" button. Adjunct 150 thereafter causes the answer tone to be provided (block 1312) and, upon receiving the subscriber profile form (block 1313), uses machine-based image recognition technology—in this case, character recognition technology—to read the form to recover the aforementioned data and thereby determine the updates desired to be made (block 1316). Adjunct 150 thereupon updates the subscriber record as a function of the recovered information (block 1318).

In alternate embodiments, it is possible for the adjunct to accept subscriber profile forms via the dialing of a special telephone number, such as a specific 700- or 800-type telephone number established for this purpose, rather than offering this functionality as an option within the subscriber menu structure, as just described. In such embodiments, however, security is a concern because there must be some way for the system to ensure that the profile form being sent is authentic, i.e., was sent by the true subscriber, not someone "posing" as the subscriber. To this end, it could be required that the subscriber enter his/her PIN via pushbutton input at the start of the telephone call or on the form itself. In the latter case, however, the PIN is subject to being compromised if someone else were to see the form.

Moreover, mechanisms other than facsimile transmission could be used to transmit the subscriber profile form to the system. For example, a subscriber could mail in a form, using normal mail facilities, to a service center at which the form is fed into a character recognition unit and the profile thereupon automatically updated. This approach also raises security concerns, but might well be regarded as highly desirable for subscribers who do not have ready access to a facsimile machine. Indeed, the system might have a menu option whereby such subscribers could request that a profile form be mailed to them.

When the subscriber enters "*#" in response to menu announcement (3), return is made to main menu announcement (1) (block 1320).

Attention is now directed, more specifically, to the subscriber profile form itself which, as shown in FIG. 8, presents at least some of the data currently existing in the subscriber profile associated with the personal telephone service number 700-555-2234.

A first section of the form includes data for two call forwarding numbers—CF1 and CF2—including data about their duration and starting date and time. Since the system illustratively allows for the possibility of three call forwarding numbers, a third blank line is provided for handwritten or typed entry of same by the subscriber. FIG. 8 shows that data for a third call forwarding number has, in fact, been written in by the subscriber.

A second section relates to call treatments. The profile already includes data associated with a) two SCINs, b) two CINs and c) the entry by a caller of the # sign as a default SCIN. Although not discussed earlier, the present illustrative embodiment allows the subscriber to define a language to be used for announcements and prompts when different CINs or SCINs are given by callers. (The SUB.LANG field that was discussed earlier, it will be remembered, defines the language to be used when the caller is the subscriber.) In this example, it can be seen that the subscriber has defined a CIN for her friend Fifi, who speaks French. Various call treatments have been identified including the forwarding of calls to call forwarding numbers (CF1 and CF2), to messaging service 200 (MSG), to the subscriber's home telephone (HOME) and to the "subscriber unavailable" (UNAV) announcement. Note that, in this particular case, the subscriber has decided that she does not want to receive calls from anyone who does not have a CIN or SCIN, even if the calling party, by entering the # sign, indicated a willingness to pay for the call. Note that the subscriber has added the third call forwarding number CF3 to the call treatment for SCIN "949." The subscriber has also stricken through the entry for CIN "9247" with a "delete" line, responsive to which the system will delete that entry from the profile. At the same time, the subscriber has defined a new CIN in which the call treatments include forwarding the call to the newly defined call forwarding number CF3.

Finally a third section gives the subscriber the opportunity to indicate that she is willing to pay for all calls—the "pay-all-calls" option described above—for some period of time. The notation (NOW "NO") on the form indicates that that option is currently unselected, and in this case the subscriber has indicated on the form that that is not to be changed.

Obviously, the layout of the form is immaterial, as long as information about the layout is known within the adjunct. Moreover, it may be decided to only allow certain aspects of the subscriber profile to be updated via the form, leaving other aspects to be update-able only via voice response. Indeed, for some aspects of a subscriber profile, the latter may be the only practical mechanism, such as in a system which allows subscribers to record, in their own voices, personalized greetings for different callers, i.e., callers inputting different CINs or SCINs. Moreover, although not shown in this embodiment, the form may include instructions which will help the subscriber to fill it in including, for example, a guide to the various abbreviations, such as MSG, UNAV, etc. Alternatively, a separate instruction sheet could be sent with the form.

The foregoing description assumes the availability of a highly sophisticated character recognition facility within adjunct 150 capable of, for example, recognizing handwriting; capable of determining which field a particular written piece of data pertains to without it having been required that that data be strictly confined to one-per-letter boxes or other demarcators printed on the forms; capable of recognizing that particular data has been stricken through with a "deletion" line; etc. To the extent that such a facility is not available or is deemed too expensive, the profile form can be built around a more simplistic, but more robust, machine-based image recognition technology, such as mark-sense technology, in which data is coded by blackening in, for example, small boxes or circles arranged in fields to represent the various pieces of data called for. Deletions could be similarly handled by providing the subscriber with a "delete" box or circle for each line of data, that box or circle to be blackened by the subscriber if that data is to be deleted. A combination of character recognition technology and mark-sense could also be used.

SERVICE ADJUNCT ARCHITECTURE

Figure 9:
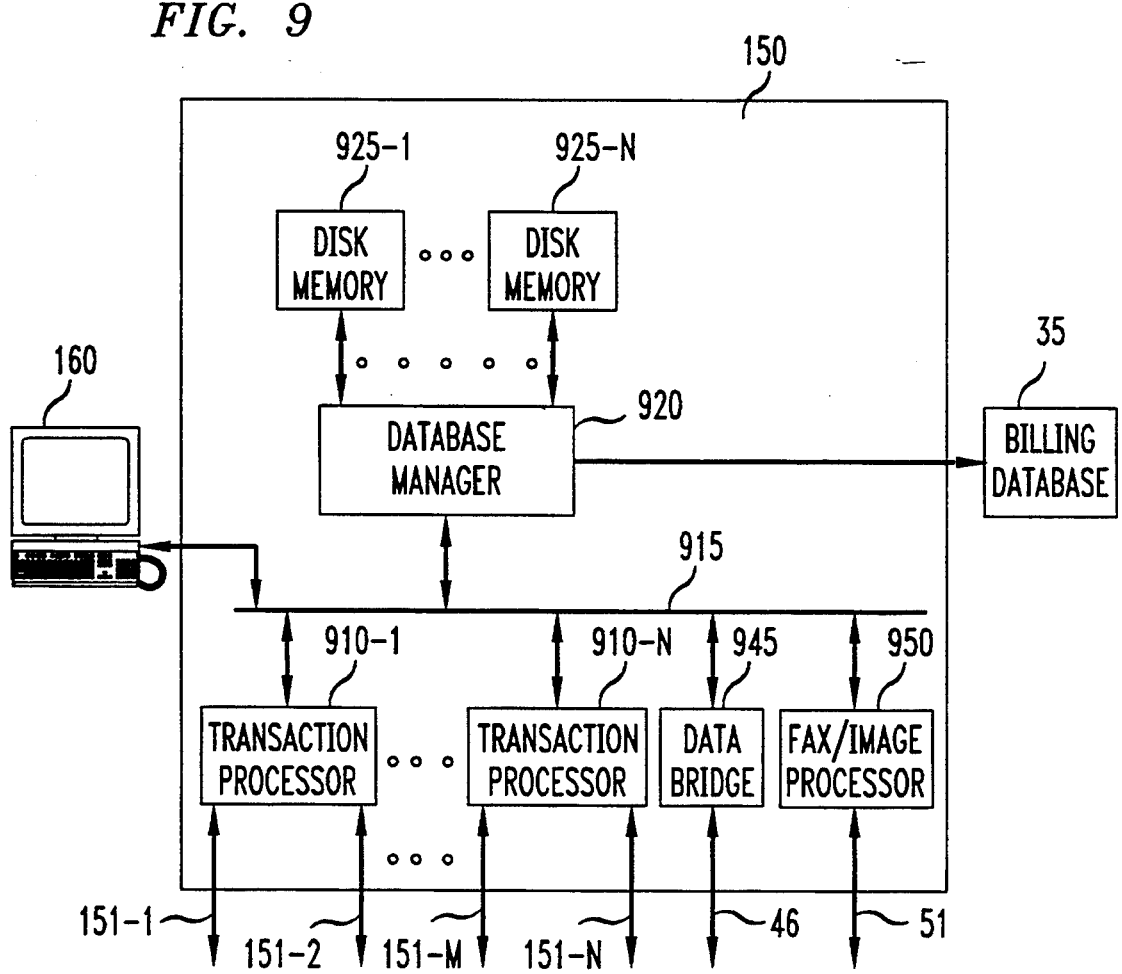
FIG. 9 is a block diagram of the service adjunct shown in FIG. 1.
Figure 10:
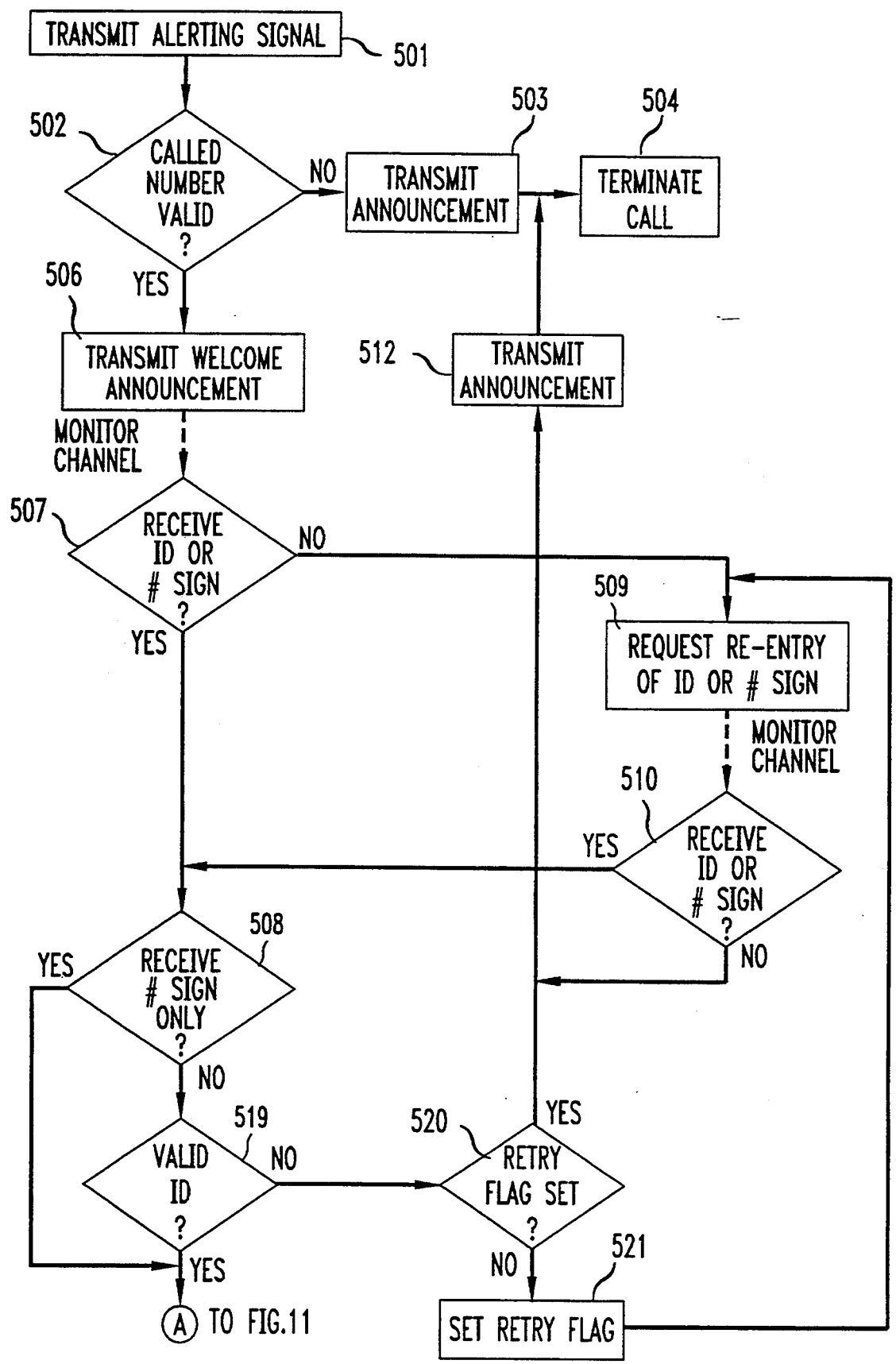
FIGS. 10-12 comprise a flow chart of the software program which executes within the service adjunct to implement the personal telephone number.
Figure 11:
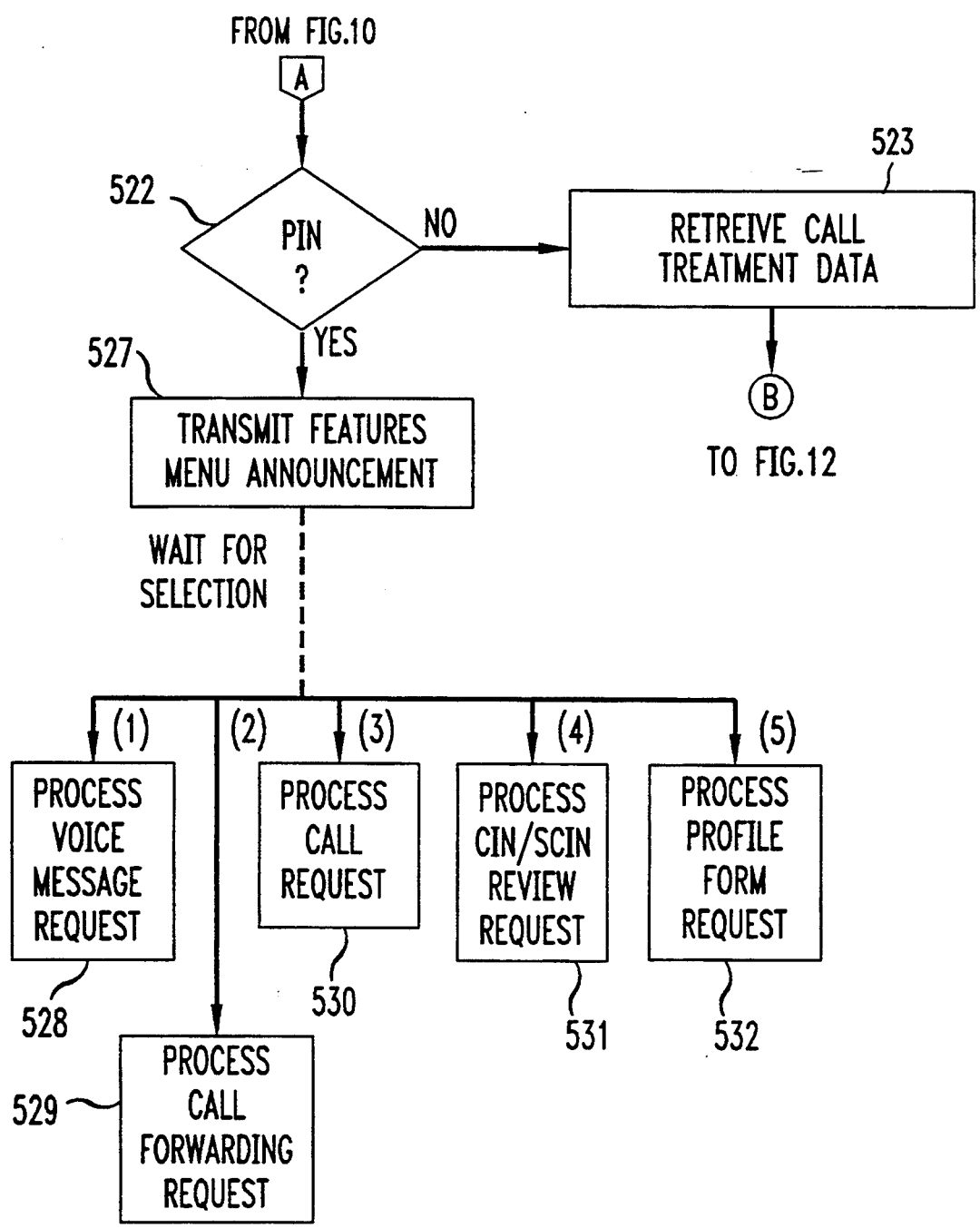
Figure 12:
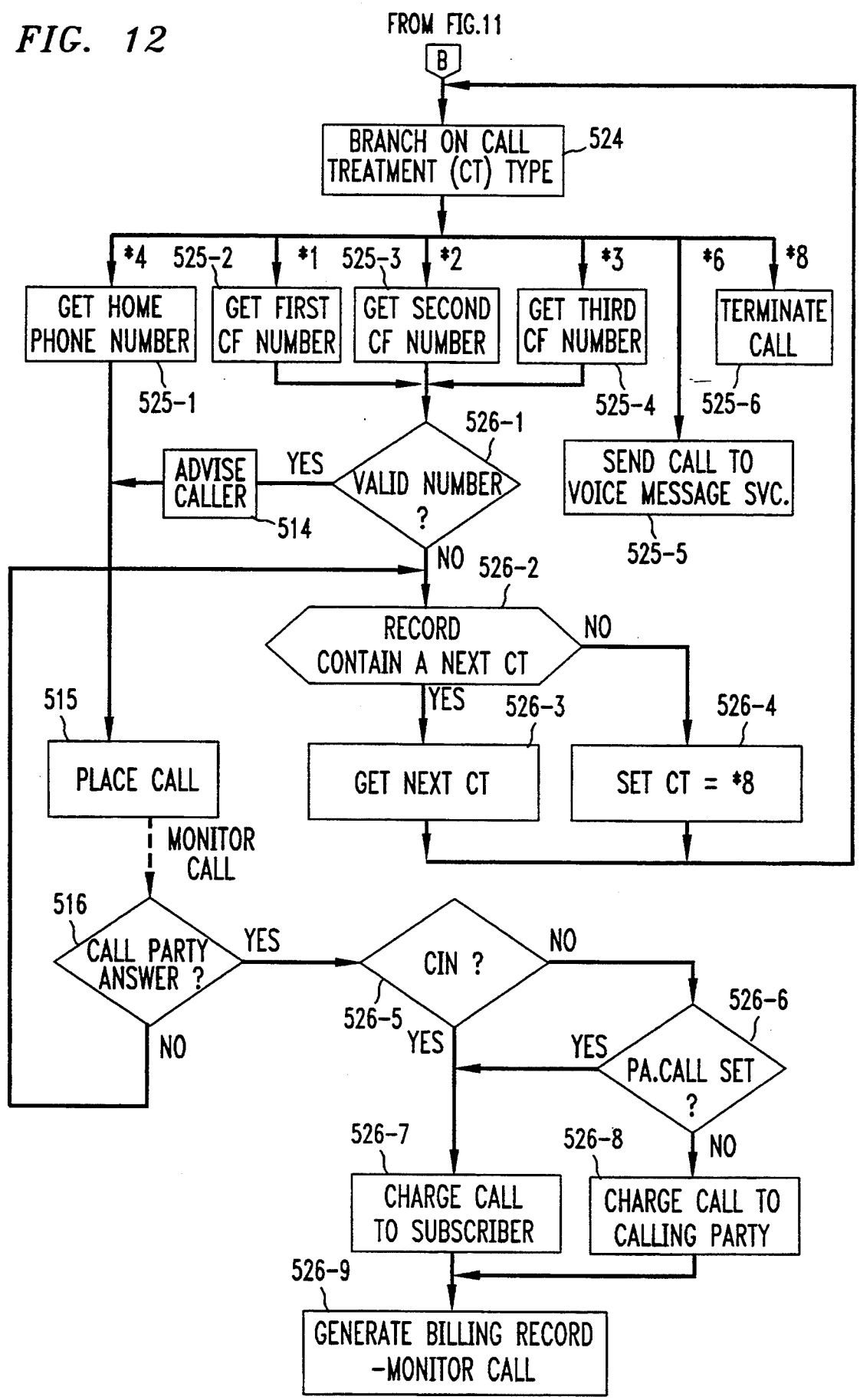

Turning now to FIG. 9, it is seen that adjunct 150 includes a number of transaction processors 910-1 through 910-N, each in communication with a database manager 920 over a bus 915 to implement the personal telephone number service. In an exemplary embodiment of the invention, each of the transaction processors 910 may be, for example, a CONVERSANT® voice information system available from AT&T.

Each one of processors 910-1 through 910-N includes a so-called 6386 work group station (not shown) which controls the overall operation of its associated processor 910 and provides standard system services, such as real time clock, memory control, and interrupt handling. The work group station also provides interactions with the keyboard and display of terminal 160, and communicates with associated peripherals via a so-called AT bus. These peripherals (not shown) include RAM, a hard disk, LAN interface as well as various other peripherals. The other peripherals include digital network interface circuits and signal processing circuits for interfacing the associated transaction processor with network 100 via respective ones of the communications paths 151-1 through 151-N. Each network interface, more particularly, provides a primary rate ISDN digital interface between adjunct 150 and a network switch, such as switch 130 (FIG. 1). Each of the communications paths 151-1 through 151-N represents a respective primary rate 24-channel circuit.

Communications between one adjunct 150 and another adjunct 150 deployed within network 100 may be established via data bridge 945 connected to bus 915 and a wide area network represented by path 46. Such communications may include changes in a subscriber record that occur as a result of the respective subscriber updating of his/her profile. Such communications also include new subscriber records. Thus, each adjunct 150 that may be disposed in network 100 is in possession of an up-to-date copy of each subscriber record.

The progression of a call established under the direction of a transaction processor 910, as well as a call received thereat via a channel associated with a respective one of the communications paths 151, is monitored by an associated signal processing circuit operating under the control of an application software program that implements the service. Such application software may be readily implemented using any one of a number of different programming languages, for example, using the Script Builder software provided by the aforementioned CONVERSANT voice interactive system. The latter software allows a programmer to define the sequences of the application software in terms of menus and in a form specifying the interactions between adjunct 150 and incoming calls as well as outgoing calls. Such interactions include, for example, (a) answering an incoming call, (b) establishing an outgoing call, (c) prompting and collecting caller input, and (d) reading associated data and making logical conclusions, in the manner discussed above. A particular strength of such Script Builder software is that it allows such interactions to be individually invoked for each of the aforementioned transmission channels.

Typically, a database query involves a subscriber record. The aforementioned application software may issue a number of such queries over the course of processing an incoming (inbound) call or establishing an outgoing (outbound) call. In an illustrative embodiment of the invention, subscriber records are stored in one of the disks 925, e.g., disk 925-1.

Also included within adjunct 150 is a facsimile/image processor 950, which is connected to bus 915 as well as to switch 130 via path 51. Processor 950 is used to a) transmit, and b) receive and interpret, subscriber profile forms pursuant to the invention. Processors capable of providing the functionality about to be described for processor 950 are commercially available. Accordingly, the present description need only discuss the overall functionality to be performed.

In particular, and referring again to FIG. 13, if a subscriber indicates after hearing announcement menu (3) a desire to receive the profile form of FIG. 8, and further indicates that the telephone from which the call is being made is associated with a facsimile machine (block 1303), the transaction processor handling the call carries out a number of steps which include a) causing the form to be formatted from the existing subscriber record (block 1306), b) signaling switch 130 to transfer the call over to processor 950 on path 51, c) delivering the form to processor 950, d) storing in the database an "incomplete session" history record in which is recorded the current "state" of the call, e.g., which part of the menu is being accessed, etc., and e) making itself available to receive another call. Processor 950 is capable of handling multiple calls simultaneously over various ports communicating over respective channels carried within path 51. However, standard "housekeeping" procedures are employed within adjunct 150 to ensure that the outgoing form is delivered to the proper port and thus the proper channel within path 51 back to the calling subscriber (block 1308).

When facsimile transmission of the subscriber profile form is complete, processor 950 generates a message on bus 915 indicating same. An available one of transaction processors 910-1 through 910-N responds to this message by, in essence, reversing the above steps. Specifically, it causes switch 130 to transfer the call to itself and it retrieves the stored "incomplete session" history from the database. The subscriber can then renew his/her interaction with the adjunct without any awareness that a different processor within the adjunct is now handling the call.

If the subscriber had specified the phone number of a facsimile machine to which the form should be sent (block 1305), no call transfer would have been effected. Rather, the transaction processor would have simply initiated a process resulting in a separate facsimile call being made via processor 950 on an as-soon-as-possible basis (block 1309).

Later, the subscriber, after hearing announcement menu (3), will indicate a desire to transmit the updated profile form. In that case, after the caller is instructed as to what to do next (block 1311), a similar series of steps to that described above will be undertaken, those steps, again, including call transfer; the storage of an "incomplete session" history; and the carrying out of "housekeeping" to ensure that the incoming facsimile message is associated within the adjunct with the subscriber in question.

Processor 950, upon providing an answer tone (block 1312) and receiving the updated form (block 1313), will a) signal for an available transaction processor to retrieve the "incomplete session" history and resume the call, as was done earlier, and b) "read", or process, the received form (block 1316). That processing involves using character recognition and/or mark-sense to decode the information provided and then to interact with database manager 920 to update the subscriber profile (block 1318). The interaction with the database manager on the part of software within processor 950 is essentially the same interaction that a transaction processor carries out when updates are supplied via the telephone set keypad.

CALL PROCESSING

Referring to FIGS. 1 and 9-12, assume that a caller, who may be the subscriber, dials the subscriber's personal telephone number 700-555-2234. The call is ultimately extended to service adjunct 150 via one of the aforementioned primary rate channels—illustratively, over path 151-1. Upon receipt of a call set-up message containing, inter alia, called and calling numbers, the adjunct 150 application program executing in transaction processor 910-1 returns over the associated channel an alerting signal, e.g., a "bong", to alert the calling party that the desired connection has been established (block 501).

The program then forms a message containing the received called number (e.g., 700-555-2234) and a request to validate the number, and sends the message to database manager 920. The latter, in turn, determines (block 502) if a subscriber record has been assigned to the called number. If thus, then manager 920 transmits a message indicating that the called number is valid back to the transaction processor. Otherwise, the message indicates that the called number is not valid, which causes the program to transmit over the path 151-1 channel an announcement indicating that the called number is not in service (block 503). The program then terminates the call (block 504) by transmitting a call termination message over the path 151-1 signaling channel.

If the called number is valid, then the program transmits a prerecorded "welcome" announcement (block 506) requesting entry of a personal identification number over the associated channel. The following is an example of such announcement:

---
"Welcome to the personalized calling system.
If you are calling from a touch-tone telephone
and have a personal calling identification         (4)
number, please enter it now followed by the
pound sign. Otherwise, just press the pound sign."
---

The program then monitors the path 151-1 channel for receipt of an identification (ID) number, i.e., a PIN, CIN, SCIN or, alternatively, the # sign. If at the end of, for example, ten seconds, no ID number or # sign was received (block 507), a re-entry message is transmitted (block 509). If neither an ID number nor a # sign is received this time (block 510), the program transmits a message indicating that the call will be terminated (block 512) and then terminates the call (block 504).

If, on the other hand, the program finds that the calling party responded to the welcome announcement (block 507 or block 510), then it checks (block 508) to see if that party entered just the # sign. If that is the case, then the program proceeds to block 522. If, on the other hand, the calling party has entered an ID number, then the program, before proceeding to block 522, checks (block 519) the validity of the entry (PIN, CIN or SCIN) by initiating a query to manager 920.

If the return message from manager 920 indicates that the entry is not valid, then the program checks to see if it has set a retry flag for the current call (block 520). If the flag is set, meaning that this is the second entry of an invalid ID, then the program proceeds to terminate the call via blocks 512 and 504. If the retry flag is not set, then the program sets it (block 521) and then requests re-entry of an ID or # sign (block 509).

If the manager 920 message indicates that the entry is valid, then the program, operating in conjunction with manager 920, checks the entered identity number (block 522) to determine if it was a PIN, i.e., contains five digits. If it was not, then it is known that either a CIN, SCIN or # sign was entered and the program retrieves a copy (block 523) of the appropriate call treatment data. The program then unloads the first Call Treatment (CT) type and branches on that type of call treatment (block 524). In particular, if that CT is *4, then the program, via manager 920, gets a copy of the called subscriber's home telephone number (block 525-1) and proceeds to place the call (block 515). If the treatment type at block 524 happens to be *1, *2 or *3, then the program obtains the corresponding call forwarding number (block 525-2, 525-3 or 525-4). It then determines (block 526-1) if the number if valid, i.e., is not zero, or the associated duration specified for the number has not expired. If the number is valid, then, again, the program proceeds to block 514, at which it advises the calling party as to the destination of the call and provides an indication as to whether the subscriber or calling party will pay for the call, it being the former if a CIN was entered and the latter if a SCIN or # sign was entered. The program then presents the caller with the option of terminating the call or proceeding with the setting up of the call to the called telephone number. If the caller is being charged for the call and does not terminate the call, then the program presents the caller with the option of charging the call to either a credit or calling card or bridging an operator onto the call for billing purposes. Otherwise, the call is charged to the calling telephone. Following this, the program proceeds to place the call (block 515). In particular, it (a) seizes, in a conventional manner, an idle one of the communications channels associated with one of paths 151-1 through 151-N, for example, path 151-2, (b) bridges the inbound channel associated with the calling station to the seized channel, and (c) sends to switch 130 via the aforementioned signaling channel a so-called "call setup" message containing, inter alia, (i) a request to establish a connection, and (ii) the called telephone number.

If the call is answered (block 516), then the program determines if the call is associated with an entered CIN (block 526-5). If that is the case, then the program sets a flag indicating that the call will be charged to the called subscriber (block 526-7). Otherwise, the program via manager 920 determines if the pay-all-calls (PA.-CALL) indicator is set (block 526-6). If that is the case, then the program proceeds to block 526-7. Otherwise, the program sets the aforementioned flag to indicate that the calling party will be billed for the call (block 526-8). The program (block 526-9) then generates a conventional telephone billing record containing, inter alia, subscriber service number, S.PIN (or SS.PIN as the case may be), calling telephone number, and entered identity number, if any (i.e., CIN or SCIN, as well as the associated name), and the aforementioned flag indicating who is being billed for the call. The program also inserts in a START field of the associated billing record the current time of day and stores the billing record in local memory. Thereafter, the program monitors the status of the bridged connection to determine the point in time at which the calling or called party terminates the call. At that point, the program inserts in an END field of the associated billing record the current date and time of day. The program then sends the billing record to manager 920 via bus 915 for storage in billing database 35.

If a call forwarding number is not valid (block 526-1) or if a called number does not answer (block 516), then the program determines (block 526-2) if the record contains a next call treatment type. If that is the case, then the program gets the next CT (block 526-3) and then proceeds to transfer on that CT type (block 524). If the associated record does not contain a next CT, then the program sets (block 526-4) a default CT to type *8 (subscriber not available) and then proceeds to block 524 and then to block 525-6, where the call is terminated.

Returning to block 522, if the program finds that the number entered by the caller is a PIN, i.e., contains five digits, then the program concludes that the calling party is the subscriber and transmits announcement (1) to the subscriber via the path 151-1 channel (block 527). The program then waits for the subscriber's selection (entry). Upon receipt of the entry, the program proceeds to an appropriate sub-program (block 528, 529, 530, 531, or 532) to process the subscriber's selection, in the manner discussed above.

The foregoing merely illustrates the principles of the invention. For example, it is within the scope of the invention that the subscriber profile form can be used to not only update the profile, as explicitly shown and described herein, but also to provide the initial data therefor. Also, profiles for telecommunications services other than personal telephone number service may be updated using the present invention. It will thus be appreciated that those skilled in the art will be able to devise numerous arrangements which, although not explicitly shown or described herein, embody the principles of the invention and are thus within their spirit and scope.

I claim:

1. A method comprising the steps of
receiving over a first call a signal containing a graphic image representing data to be incorporated into a profile of a telecommunications service, said profile being associated with a particular subscriber of said service,
using machine-based recognition to identify said data from said image,
entering said data into said profile, and
using the data in the profile to provide said service for a second call to said subscriber that is placed subsequent to said first call, the origination of said second call being independent of receipt of said first call.

2. The invention of claim 1 wherein said step of using machine-based image recognition includes using at least one of character recognition and mark-sense.

3. The invention of claim 1 comprising the further step of transmitting via facsimile transmission to said subscriber and in response to a request from said subscriber, a form on which said data is to be supplied in graphic form by said subscriber and then transmitted as said graphic image.

4. The invention of claim 3 wherein said form, as transmitted to said subscriber, contains data already existing in said profile.

5. The invention of claim 1 wherein said service is a personal telephone number service which includes the forwarding of calls to at least a first subscriber-defined call forwarding number and wherein, in said receiving step, said data to be incorporated into said profile includes data specifying said first subscriber-defined call forwarding number.

6. The invention of claim 1 wherein said service is a personal telephone number service in which callers are prompted to enter a pre-defined caller identification number and in which calls are accorded respective call treatments as a function of the caller identification number entered by a caller and wherein, in said receiving step, said data to be incorporated into said profile includes data specifying a call treatment to be carried out when a particular caller identification number is entered by a caller.

7. The invention of claim 1 wherein, in said receiving step, said graphic image is received via facsimile transmission.

8. The invention of claim 5 wherein, in said receiving step, said graphic image is received via facsimile transmission.

9. The invention of claim 6 wherein, in said receiving step, said graphic image is received via facsimile transmission.

10. A method for use in a system which implements a telecommunications service for a subscriber in accordance with a profile associated with said subscriber, said method comprising the steps of
receiving on a call a signal representing a graphic image containing information defining changes to be made to said profile,
recovering said information from the received graphic image using machine-based image recognition,
updating said profile as a function of the recovered information; and
using said updated profile for processing new calls to said subscriber that are originated from a location other than said system and subsequent to completion of said updating step.

11. The invention of claim 10 wherein, in said receiving step, said graphic image is received via facsimile transmission.

12. The invention of claim 10 wherein said telecommunications service is a personal telephone number service in which calls placed to a personal telephone number assigned to said subscriber are accorded respective call treatments in accordance with said profile, one of said call treatments including the forwarding of calls to at least a first subscriber-defined call forwarding number, and wherein, in said receiving step, one of said changes includes specification of a call forwarding number.

13. The invention of claim 10 wherein said telecommunications service is a personal telephone number service in which calls placed to a personal telephone number assigned to said subscriber are accorded respective call treatments in accordance with said profile, and wherein callers to said personal telephone number are prompted to enter respective pre-defined caller identification numbers and in which calls are accorded respective call treatments as a function of the caller identification number entered by a caller.

14. The invention of claim 10 wherein said graphic image is a hard-copy version of said profile on which said changes have been indicated by said subscriber.

15. The invention of claim 14 wherein, in said receiving step, said graphic image is received via facsimile transmission.

16. The invention of claim 10 comprising the further steps of
receiving, from said subscriber, a request for a form on which said changes can be indicated, and
transmitting said form to said subscriber.

17. The invention of claim 16 wherein said method comprises the further steps of
receiving a call from said subscriber,
verifying the identity of said subscriber,
prompting said subscriber, after verifying his/her identity, with a plurality of options, including the option for said subscriber to make said request for a hard-copy version of said profile.

18. The invention of claim 16 wherein said transmitting step is carded out by transmitting said form to said subscriber using facsimile transmission.

19. The invention of claim 16 wherein said form is a hard-copy version of said profile and wherein said method includes the further step of formatting said hard-copy version of said profile prior to said transmitting step.

20. The invention of claim 19 wherein said transmitting step is carried out by transmitting said form to said subscriber using facsimile transmission.

21. The invention of claim 16 wherein said method comprises the further steps of receiving a call from said subscriber, verifying the identity of said subscriber, prompting said subscriber, after verifying his/her identity, with a plurality of options, including the option for said subscriber to transmit said graphic image, and in response to a selection of said option by said subscriber, initiating said graphic image receiving step.

22. The invention of claim 21 wherein, in said receiving step, said graphic image is received via facsimile transmission.

23. A method of administering a subscriber profile associated with a telecommunications service provided by a telecommunications network, comprising the steps of:

receiving on a first call a signal containing a graphic image representing data to be entered into said subscriber profile, deriving the data from the image by way of image recognition equipment, entering the derived data into said subscriber profile, and using the data in the subscriber profile to provide said telecommunications service for at least one other call that is placed to said subscriber subsequent to said first call, the origination of said other call being unrelated to receipt of said first call.

* * * * *